(12) United States Patent
Tang et al.

(10) Patent No.: US 11,062,070 B2
(45) Date of Patent: Jul. 13, 2021

(54) DIE TO DIE INTERCONNECT STRUCTURE FOR MODULARIZED INTEGRATED CIRCUIT DEVICES

(71) Applicant: Intel Corporation, Santa Clara, CA (US)

(72) Inventors: Lai Guan Tang, Tanjung Bungah (MY); Chee Hak Teh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 16/368,696

(22) Filed: Mar. 28, 2019

(65) Prior Publication Data

US 2019/0220566 A1    Jul. 18, 2019

(51) Int. Cl.

| | |
|---|---|
| *G06F 30/34* | (2020.01) |
| *H01L 25/18* | (2006.01) |
| *H01L 23/00* | (2006.01) |
| *G06F 13/20* | (2006.01) |
| *H04J 3/02* | (2006.01) |
| *G06F 115/08* | (2020.01) |

(52) U.S. Cl.
CPC ............. *G06F 30/34* (2020.01); *G06F 13/20* (2013.01); *H01L 24/16* (2013.01); *H01L 25/18* (2013.01); *H04J 3/02* (2013.01); *G06F 2115/08* (2020.01); *H01L 2224/16225* (2013.01); *H01L 2924/1431* (2013.01); *H01L 2924/1436* (2013.01)

(58) Field of Classification Search
CPC ....................................................... G06F 30/34
USPC ........................................................ 716/116
See application file for complete search history.

(56) References Cited

U.S. PATENT DOCUMENTS

2019/0303328 A1\* 10/2019 Balski ................. G06F 15/7825

\* cited by examiner

*Primary Examiner* — Eric D Lee
(74) *Attorney, Agent, or Firm* — Fletcher Yoder P.C.

(57) ABSTRACT

Systems or methods of the present disclosure may facilitate meeting connectivity demands between the dies of the modularized integrated circuits. Such an integrated circuit system may include a first die of programmable fabric circuitry that is communicatively coupled to a second die of modular periphery intellectual property (IP) tile via a modular interface. The modular interface may enable communication between a first microbump of the first die and a second microbump of the second die using a time-division multiplexing (TDM) technique. The modular interface may also enable communication between the first microbump and the second microbump using a wire-to-wire connection that does not comprise the TDM technique.

13 Claims, 6 Drawing Sheets

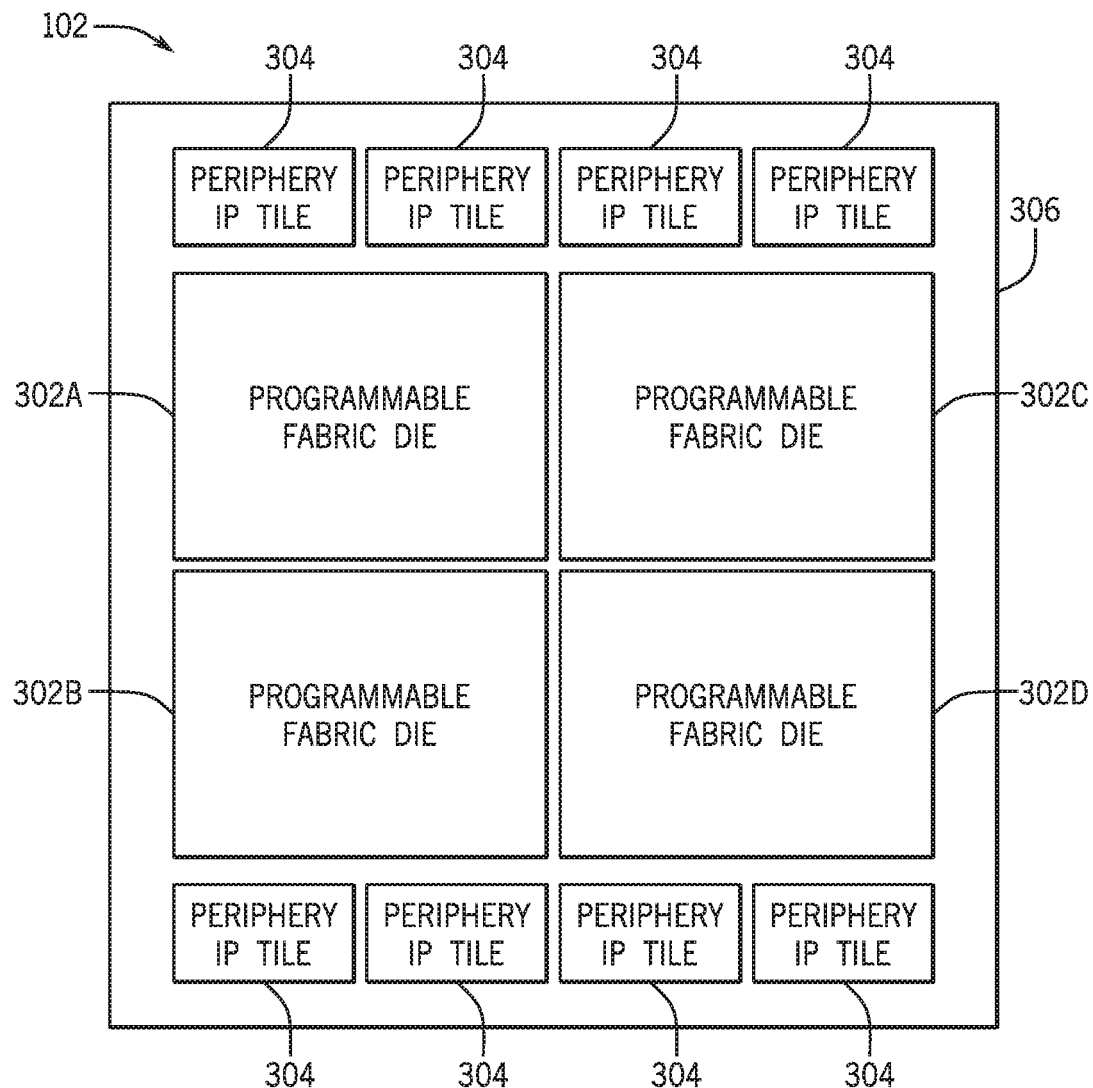
FIG. 3
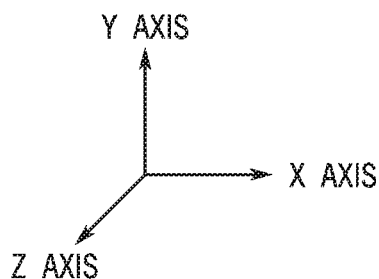

DIE TO DIE INTERCONNECT STRUCTURE FOR MODULARIZED INTEGRATED CIRCUIT DEVICES

BACKGROUND

The present disclosure relates to connectivity between dies of an integrated circuit system, such as between a programmable fabric die and a periphery intellectual property (IP) tile of a modularized integrated circuit system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Modern electronics, such as computers, portable devices, network routers, data centers, Internet-connected appliances, and more, tend to include at least one integrated circuit device. Integrated circuit devices may take on a variety of forms, including processors (e.g., central processing units (CPUs)), memory devices, and programmable devices (e.g., FPGA), to name only a few examples. The programmable devices, in particular, may include a programmable fabric of logic that may be programmed (e.g., configured) and reprogrammed (e.g., reconfigured) after manufacturing to provide a wide variety of functionality based on a circuit design.

To facilitate different functionalities, the programmable device may include a variety of periphery intellectual property cores (IPs) near and around the programmable fabric. For example, a universal interface bus (UM) IP may be placed on a shoreline of the programmable fabric to avoid consuming excess routing circuitry of the programmable fabric. However, due to the restricted amount of shoreline and the manner in which the periphery IP are included in the programmable device design, resulting design compromises may reduce functional and operational efficiency of the programmable device.

BRIEF DESCRIPTION OF THE DRAWINGS

Various aspects of this disclosure may be better understood upon reading the following detailed description and upon reference to the drawings in which:

FIG. 3 is a schematic of an integrated circuit device including periphery intellectual property cores (IPs) that have been disaggregated from a programmable fabric, in accordance with an embodiment of the present disclosure;

DETAILED DESCRIPTION OF SPECIFIC EMBODIMENTS

Figure 1:
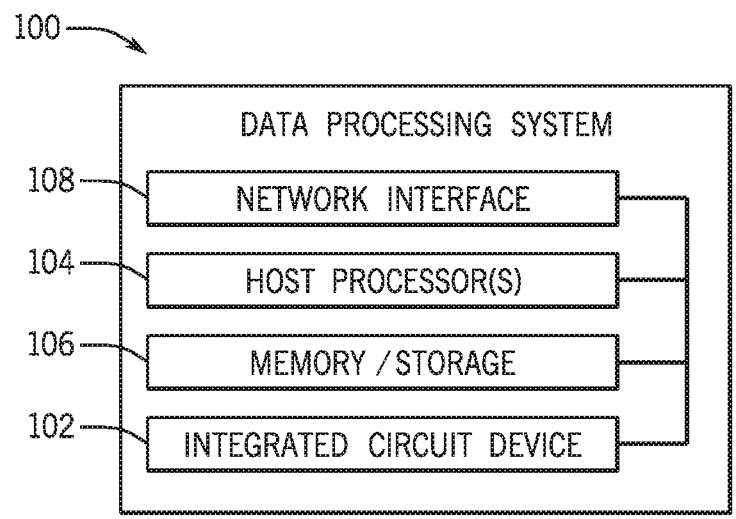
FIG. 1 is a block diagram of a data processing system including an integrated circuit device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Integrated circuits, such as field-programmable gate arrays (FPGAs), may include a programmable fabric (e.g., logic array blocks (LABs), having log elements such as digital signal processing (DSP) blocks, routing multiplexers (muxes), and so on) that may be configured and, in some cases, later reconfigured to realize a circuit design. To facilitate different functionalities, the integrated circuit may include one or more periphery intellectual property cores (IPs) located near the programmable fabric. For example, for FPGAs, higher bandwidth periphery IP (e.g., double data rate (DDR), low power DDR (LPDDR), high bandwidth memory (HBM), embedded static random-access memory (eSRAM), universal interface bus (UIB), input/output (I/O), and the like) may be placed around (e.g., top, bottom) the programmable fabric (e.g., at a shoreline, border, or at periphery of the programmable fabric) to improve resource (e.g., routing circuitry) allocation throughout the FPGA. In some embodiments, such a configuration of the periphery IPs may occur in monolithic (e.g., fabrication of multiple components on a single silicon chip) FPGA designs. That is, the periphery IPs may be included as part of the FPGA main die. Although the present disclosure will primarily use the example of a programmable device (e.g., FGPA), systems and techniques of this disclosure may be applied to any suitable integrated circuit device, such as a processor (e.g., central processing unit (CPU), graphics processing unit (GPU)), memory, and the like.

Such monolithic FPGAs however, may include a limited amount of shoreline around the programmable fabric, forcing compromises with regard to incorporation of the periphery IPs (e.g., type, number) in the design. As an example, a single floorplan (e.g., integrated circuit layout) may be used for multiple device variations that each have different specifications for the periphery IP and the programmable fabric. Using a single floorplan may reduce design and fabrication costs. However, to improve applicability of the single floorplan to the multiple product variations, the floorplan may include a design that compromises on the number of UIBs, I/Os, eSRAMs, and other periphery IP that may be included around the limited shoreline. Thus, the monolithic FPGA designs may result in reduced device performance for each device variation and reduced overall scalability for multiple device variations.

As another example, in a monolithic FPGAs, routing between the periphery IPs and the programmable fabric may occur via horizontal input/output (HIO) and/or vertical I/O (VIO) located on the shoreline. However, the HIO and VIO may have limited reach into the programmable fabric and may be limited in number due to the finite shoreline. Thus, the monolithic FPGA design may encounter routing congestion due to the allocation of too many components to a limited amount of routing resources, further resulting in reduced device performance. Additionally, fabrication of a monolithic FPGAs may be cost-inefficient and process intensive due to poor silicon yield (e.g., number of properly performing silicon dies on a wafer).

To improve device performance and silicon yield of an integrated circuit such as the FPGA, the integrated circuit may be disaggregated into smaller dies. For example, an FPGA may be disaggregated into periphery IP tiles, which each include architecture for a particular periphery IP, and programmable fabric dies (e.g., glue dies) that include the programmable logic fabric. Once disaggregated, the periphery IP tiles may be independently designed and fabricated from the design and fabrication of the glue dies. Further, the interface between the dies and the tiles of the disaggregated FPGA may be standardized to enable modularization of the dies and the tiles. For example, with a standardized interface, any type of periphery IP tile may be incorporated into the FPGA design. As such, the cost and time consumed during tape-in and tape-out for the variation designs may be reduced.

However, the standardized interface of the disaggregated FPGAs may not meet connectivity demands for appropriately communicating data between the periphery IP tiles and the glue dies. In particular, some periphery IP tiles may have relatively high connectivity (e.g., number of wire) demands between the periphery IP tile and the glue die based on bandwidth supported by the periphery IP tile. The number of connections demanded by the periphery IP tile may exceed the number of microbumps (e.g., die-to-die interconnections) available, for example, on a sector of the glue die. As an illustrative example, a universal interface bus (UIB) IP tile may facilitate interfacing with high bandwidth memory (HBM) and thus, may use a larger number of connections to push the large amounts of bandwidth. At half-rate operations, the UIB may use approximately 3300 microbumps to fully support bandwidth to both the glue die and the HBM. A sector of the glue die however, may accommodate approximately 2300 microbumps and thus, connectivity demands may not be met between the glue die and the UIB IP tile. When connectivity demands between the tiles/dies are not properly supported, disaggregation of the FPGA may not be possible.

Accordingly, and as further detailed below, embodiments of the present disclosure relate generally to meeting connectivity demands between dies, such as between the glue die and the periphery IP tile, of the disaggregated (e.g., modularized) integrated circuit. In some embodiments, communication between the glue die and the periphery IP tile may occur, for example, via a silicon interposer (e.g., link, electrical signal conduits) and stitched (e.g., joined) direct communication, such as via a direct interface column (e.g., Advanced Interface Bus-Direction (AIB-D)).

In some embodiments, the direct interface column may be implemented using a time-division multiplexing (TDM) structure that coordinates data transfer between the glue die and the periphery IP tile. That is, the TDM structure may provide synchronous and accelerated data transfer, thereby increasing the number of connections between the dies and reducing the number of microbumps used to meet connectivity demands. As such, the tile and/or die area may be reduced by, for example, 20-30% as compared to when a non-TDM connection is used.

Further, in some embodiments, the direct interface column may be spread at least throughout the glue die. For example, four or more direct interface columns may be placed deep into a sector of the glue die, enabling low latency connection between the glue die and periphery IP tile. In addition, the placement of the direct interface columns may reduce routing congestions as compared to the HIOs/VIOs traditionally used in monolithic FPGA designs.

With the foregoing in mind, FIG. 1 is a block diagram of a data processing system 100 including an integrated circuit device 102, in accordance with an embodiment of the present disclosure. The data processing system 100 may include more or fewer components (e.g., electronic display, user interface structures, application specific integrated circuits (ASICs)) than shown. The data processing system 100 may include one or more host processors 104, such as an INTEL® Xeon® processor or a reduced-instruction processor (e.g., a reduced instruction set computer (RISC), an Advanced RISC Machine (ARM) processor) that may manage a data processing requests for the data processing system 100 (e.g., to perform machine learning, video processing, voice recognition, image recognition, data compression, database search ranking, bioinformatics, network security pattern identification, spatial navigation, or the like).

The host processor(s) 104 may communicate with the memory and/or storage circuitry 106, which may be a tangible, non-transitory, machine-readable-medium, such as random-access memory (RAM), read-only memory (ROM), one or more hard drives, flash memory, or any other suitable optical, magnetic or solid-state storage medium. The memory and/or storage circuitry 106 may hold data to be processed by the data processing system 100, such as processor-executable control software, configuration software, system parameters, configuration data, etc.

The data processing system 100 may also include a network interface 108 that allows the data processing system 100 to communicate with other electronic devices. In some embodiments, the data processing system 100 may be part of a data center that processes a variety of different requests. For instance, the data processing system 100 may receive a data processing request via the network interface 108 to perform machine learning, video processing, voice recognition, image recognition, data compression, database search ranking, bioinformatics, network security pattern identification, spatial navigation, or some other specialized task. The data processing system 100 may further include the integrated circuit device 102 that performs implementation of data processing requests.

Figure 2:
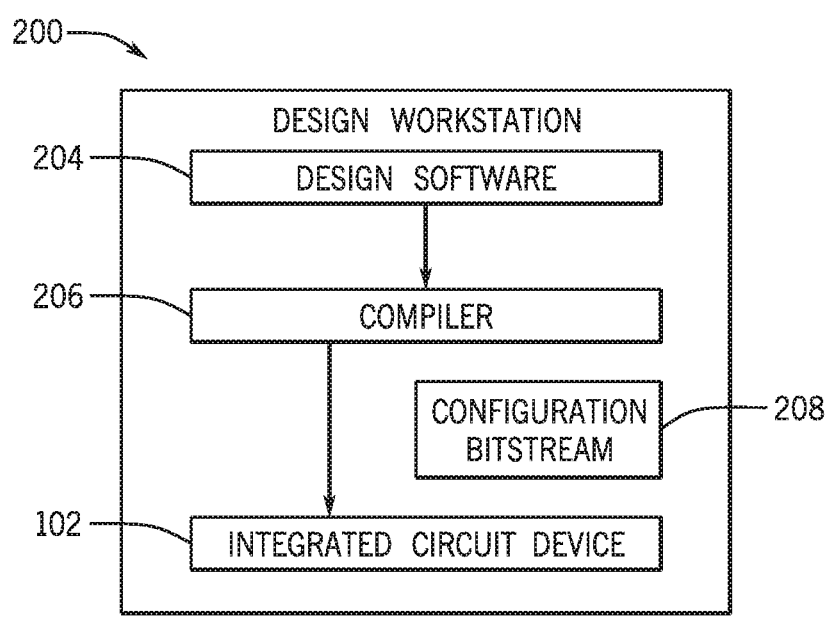
FIG. 2 is a block diagram of a design workstation that may facilitate programming of the integrated circuit device of FIG. 1, in accordance with an embodiment of the present disclosure.

A designer may use a design workstation 200 to develop a design that may configure the integrated circuit device 102, as shown in FIG. 2, in accordance with an embodiment of the present disclosure. In some embodiments, the designer may use design software 204 (e.g., Intel® Quartus® by INTEL CORPORATION) to generate a design that may be used to program (e.g., configure) the integrated circuit device 102. For example, a designer may program a modularized integrated circuit device 102 to implement a specific functionality, such as implementing a circuit design (e.g., higher-level circuit design), as if the integrated circuit device 102 were monolithic. The integrated circuit device 102 may be a programmable integrated circuit, such as a field-programmable gate array (FPGA) that includes the programmable fabric die(s) and periphery IP tile die(s), which together implement one or more circuit designs.

As such, the design software 204 may use a compiler 206 to generate a lower-level circuit-design configuration for the integrated circuit device 102. That is, the compiler 206 may provide machine-readable instructions representative of the designer-specified functionality to the integrated circuit device 102, for example, in the form of a configuration bitstream 208. The host processor(s) 104 may coordinate the loading of the bitstream 208 onto the integrated circuit device 102 and subsequent programming of the programmable fabric.

To improve scalability and silicon yield of the integrated circuit (e.g., FPGA), the periphery IP may be modularized into periphery IP tile, such that design and fabrication of the periphery IP tile may occur independently of the design and fabrication of the programmable fabric die (e.g., glue die) and in a manner that enables modular interfacing (e.g., as defined by a specification to achieve a substantially uniform manner of interfacing for different tiles, which may be standardized) between the periphery IP tile and the programmable fabric die. As such, FIG. 3 illustrates an example of the integrated circuit device 102 constructed with disaggregated periphery IP tiles and programmable fabric dies, in accordance with an embodiment of the present disclosure. Although the integrated circuit device 102 is shown as an FPGA, it should be appreciated that the periphery IP tiles may be disaggregated for any suitable type of integrated circuit device 102.

As shown, one or more programmable fabric dies 302A, 302B, 302C, 302D (collectively, 302) may be included in the integrated circuit device 102 to facilitate programming of the FPGA. In particular, the programmable fabric die 302 may include the programmable fabric, which may be divided into one or more sectors that each include programmable logic. The programmable logic may be arranged in groups that are sometimes referred to as configurable logic blocks (CLBs) or Logic Array Blocks (LABs). The programmable logic may also include memory LABs (MLABs), DSP blocks, routing multiplexers, and so on. The programmable logic may receive the configuration bitstream 208 from the host processor(s) 104 and may be configured in accordance with the circuit design embodied by the configuration bitstream 208. The programmable fabric dies 302 may be configured or partially configured at run-time and/or may be re-configured or partially re-configured at a later time, enabling design flexibility post-manufacturing.

Further, as shown, periphery IP tiles 304 may be placed near the programmable fabric dies 302. The periphery IP tiles 304 may include periphery IPs, such as I/O IP, UIB IP, memory IPs, and the like. The periphery IP tiles 304 may be designed and/or fabricated independently of the programmable fabric dies 302 since the periphery IP tiles 304 are not on the same die as the programmable fabric dies 302. Thus, the periphery IPs may no longer limit buildable die size or FPGA design flexibility.

Communication on the integrated circuit device 102 may occur via an embedded interface bridge, such as a silicon interposer 306 (e.g., a signal conducting channel through the silicon base material). In particular, intra-fabric communication within the programmable fabric die (e.g., 302A) may remain intact despite modularization of the periphery IP. Further, inter-programmable fabric die communication (e.g., fabric-to-fabric communication) may occur through interfaces within the silicon interposer 306, as may communication between the programmable fabric dies 302 and the periphery IP tile 304. Because the communication interface (e.g., modular interface) is defined by a specification and is direct (e.g., communication occurs between the programmable fabric dies 302 and the periphery IP tile 304 without use of a network-on-chip), the integrated circuit device 102 may be customized for different product variations and may be programmed by the design workstation 200 as if the integrated circuit device 102 were monolithic.

Figure 4:
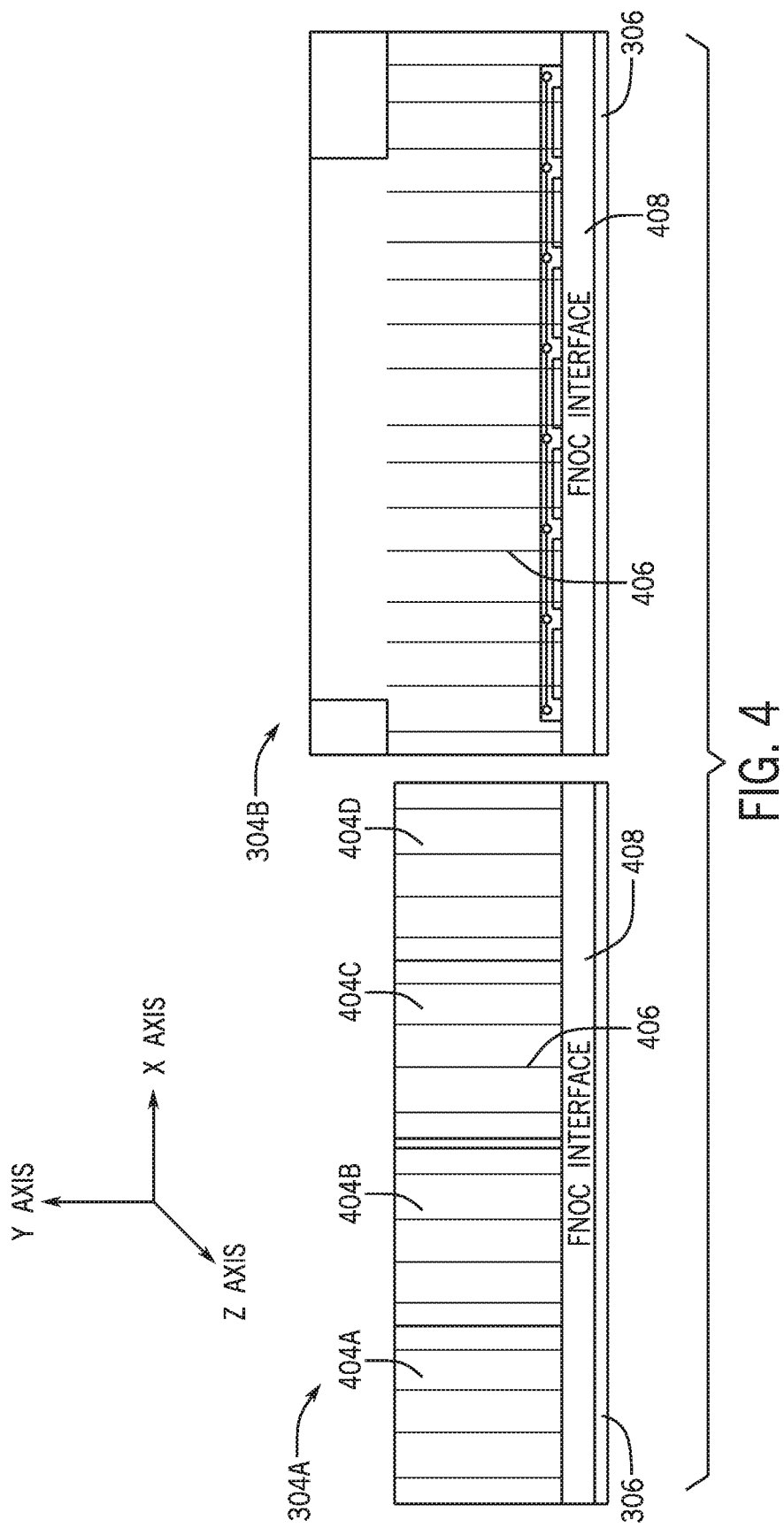
FIG. 4 is a schematic of periphery IP architecture of modularized periphery IP tiles, in accordance with an embodiment of the present disclosure.

FIG. 4 illustrates an example of periphery IP tiles 304 that may be designed and fabricated independent of the programmable fabric dies 302, in accordance with an embodiment of the present disclosure. In some embodiments, the periphery IP tiles 304 may be an I/O tile 304A and/or a UIB tile 304B. Briefly, the I/O tile 304A and UIB tile 304B may be used to facilitate communication between the programmable fabric dies 302 and external devices. The I/O tile 304A and UIB tile 304B may be separated into separate tiles due to design bandwidth and capacity constraints. In particular, certain device applications may use higher memory bandwidth while compromising on memory capacity or vice versa.

For example, certain external memory IP, such as high bandwidth memory (HBM) IP or external ASIC may support high memory bandwidth while compromising memory capacity and, thus may be multiplexed to the UIB tile 304B. Other external memory IP, such as double data rate (DDR) IP, may support higher memory capacity while compromising on memory bandwidth and, thus may be multiplexed to the I/O tile 304A. By separating the device interface into the I/O tile 304A and the UIB tile 304B, connections between the programmable fabric dies 302 and external devices may be tailored (e.g., via multiplexing) depending on the target product variation. As such, the modularized periphery IP tiles 304 may enable customization of product variations and future product scalability.

The I/O tile 304A may include any suitable number of IO blocks and/or physical IO connection lanes. In the example of FIG. 4, there are four IO96 blocks 404A, 404B, 404C, 404D (collectively, 404) that each supports 96 IO connection lanes, but more or fewer may be supported by different blocks. Each IO96 block 404 may be a baseline configurable I/O block that can be programmed to form a general-purpose input output (GPIO) port and/or programmed to interface with external devices, such as external memory (e.g., DDR). In this example, each IO96 block 404 may include 4 microbumps that provide die-to-die connectivity. In particular, and as will be discussed in further detail below, each microbump may be associated with an Advanced Interface Bus-Direct intellectual property column (AIB-D IP column) 406 used to connect (e.g., directly connect) the programmable fabric dies 302 and the periphery IP tiles 304 via the silicon interposer 306 without using network-based communication, such as a network-on-chip interface, during communication. Further, the I/O tile 304A may include an interface for a fabric network-on-chip (FNOC) 408 that may bridge the I/O tile 304A to the programmable fabric dies 302 using a high-speed (e.g., high-bandwidth of 0.25-0.5 terabytes per second per direction per link) NOC interface.

Similarly, the UIB tile 304B may include the AIB-D interface 406 and the interface for the FNOC interface 408 to facilitate connectivity between the UM tile 304B and the programmable fabric dies 302. Although the I/O tile 304A and the UM tile 304B are not part of the programmable fabric die 302, the tiles 304A, 304B may include the FNOC interface 408 to facilitate communication with the programmable fabric dies 302. Further, it should be understood that the periphery IP tiles 304 have been described using the I/O tile 304A and UIB tile 304B, the periphery IP tiles 304 may be any IP tile, such as a DDR IP tile. Additionally, and as will be discussed in further detail below, it should be understood that the periphery IP tiles 304 may include any suitable number of microbumps to facilitate communication between the periphery IP tiles 304 and the programmable fabric die 302.

Figure 5:
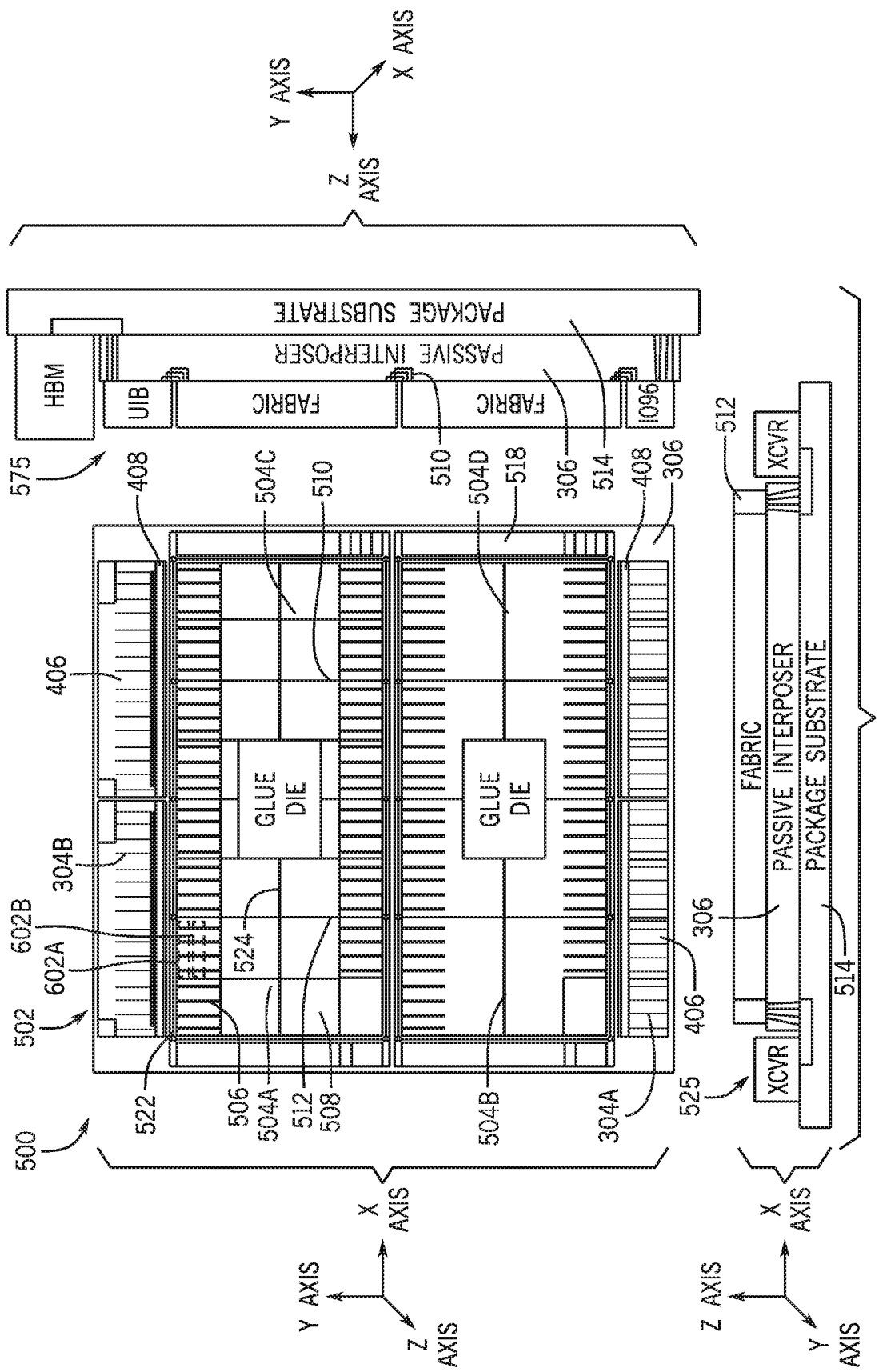
FIG. 5 is a schematic of a disaggregated integrated circuit device that includes the architecture of the periphery IPs tiles of FIG. 4 and programmable fabric tiles (e.g., glue dies), in accordance with an embodiment of the present disclosure.

The disaggregated FPGA device 500 of FIG. 5 further illustrates the connectivity and placement architecture for the modularized periphery IP tiles 304 and the programmable fabric dies 302, in accordance with an embodiment of the present disclosure. It should be appreciated that while the FPGA device 500 is shown with a certain number of programmable fabric dies 302, connections, and periphery IP tile 304 type, the present disclosure contemplates any suitable variations of the FPGA device 500.

The FPGA device 500 is shown as a top view 502 and with side views 525, 575. The FPGA device 500 may include the periphery IP tiles 304, such as the I/O tile 304A and the UIB tile 304B. As depicted, the periphery IP tiles 304 and the programmable fabric dies (e.g., glue dies) 504A, 504B, 504C, 504D (collectively, 504) of the FPGA device 500 may include the AM-D interface 406,506 to provide connection between the dies without using network-based communication. In particular, the number of AIB-D interfaces 406, 506 included within the periphery IP tile 304 and the glue dies 504 may be based on the number of microbumps available and may be defined by a specification that modularizes the interface between the periphery IP tile 304 and the glue dies 504. For example, the I/O tile 304A may include four IO96 blocks, each with four AIB-Ds interface columns 406 since a glue die 504 may be four sectors 508 wide and each sector 508 may support four AIB-D interface columns 506.

Additionally, the AIB-D interface 406 may include a greater number of and/or wider columns to facilitate communication with increased shoreline reach without using network-based communication (e.g., NOC), such that the periphery IP tile 304 may communicate with the glue die 504 without consuming excess amount of routing circuitry of the programmable fabric in the glue die 504. For example, the AIB-D interface 406 may include five IP columns that increase the shoreline reach five times than that which was available when only horizontal connections of the glue die 504 were used for interfacing. It should be appreciated that any suitable number of IP columns and of any suitable width may be included in the periphery IP tiles 304 and/or the glue dies 504.

Additionally, while 406 enable communication between the periphery IP tile 304 and the glue die 504, other components of the FPGA device 500 may communicate via the NOC, such as an FNOC interface 408 or source of configuration network-on-chip (CNOC). As previously described, the periphery IP tiles 304 may include an FNOC interface 408 that is used for high-speed communication with the NOCs 510 of the glue die 504. In particular, Advanced Interference Bus-Edge (AIB-E) (e.g., edge interface) may facilitate high-speed DDR interfacing over the FNOC interface 408, 510. For example, the AIB-E may bridge together the NOCs 510 of the glue die 504, the NOCs 510 within the glue die (e.g., 504A), and/or the NOC 510 of the glue die 504 to the FNOC interface 408 of the periphery IP tiles 304. Further, the AIB-E may transmit packetized data from router 512 to router 512 until the packetized data reaches its destination.

The FPGA device 500 may also include Advanced Interface Bus-Generic (AIB-G) (e.g., generic interface) 518 interface that is used to bridge dies with low connection bandwidth, such as to transceiver blocks. Additionally, as shown by side views 525, 572, the glue die 504 and the periphery IP tiles 304 may rest on the silicon interposer (e.g., passive interposer) 306. The silicon interposer 306 may in turn be supported by the package substrate 514, which facilitates electrical connections of the FPGA device 500. While the silicon interposer 306 is described as a passive interposer in many of the examples, in some embodiments, the silicon interposer 306 may also or alternatively contain active components and may be an active interposer.

It should be appreciated that because the interface between the periphery IP tiles 304 and the glue dies 504 is defined by a specification and because the periphery IP tiles 304 are modularized, various combinations of periphery IP tiles 304 may be included within an FPGA die. For example, the FPGA device 500 may include a single UM tile 304B and multiple I/O tiles 304A. As another example, the FPGA device 500 may include only I/O tiles (e.g., 304A). Additionally, the glue dies 504 may include different instances of the core fabric. For example, the glue dies (e.g., 504A, 504C) may include a higher number of digital signal processing (DSP) blocks than other glue dies (e.g., 504B, 504D). As another example, the glue dies (e.g., 504B, 504D) may include more memory blocks than the other glue dies (e.g., 504A, 504C).

Figure 6:
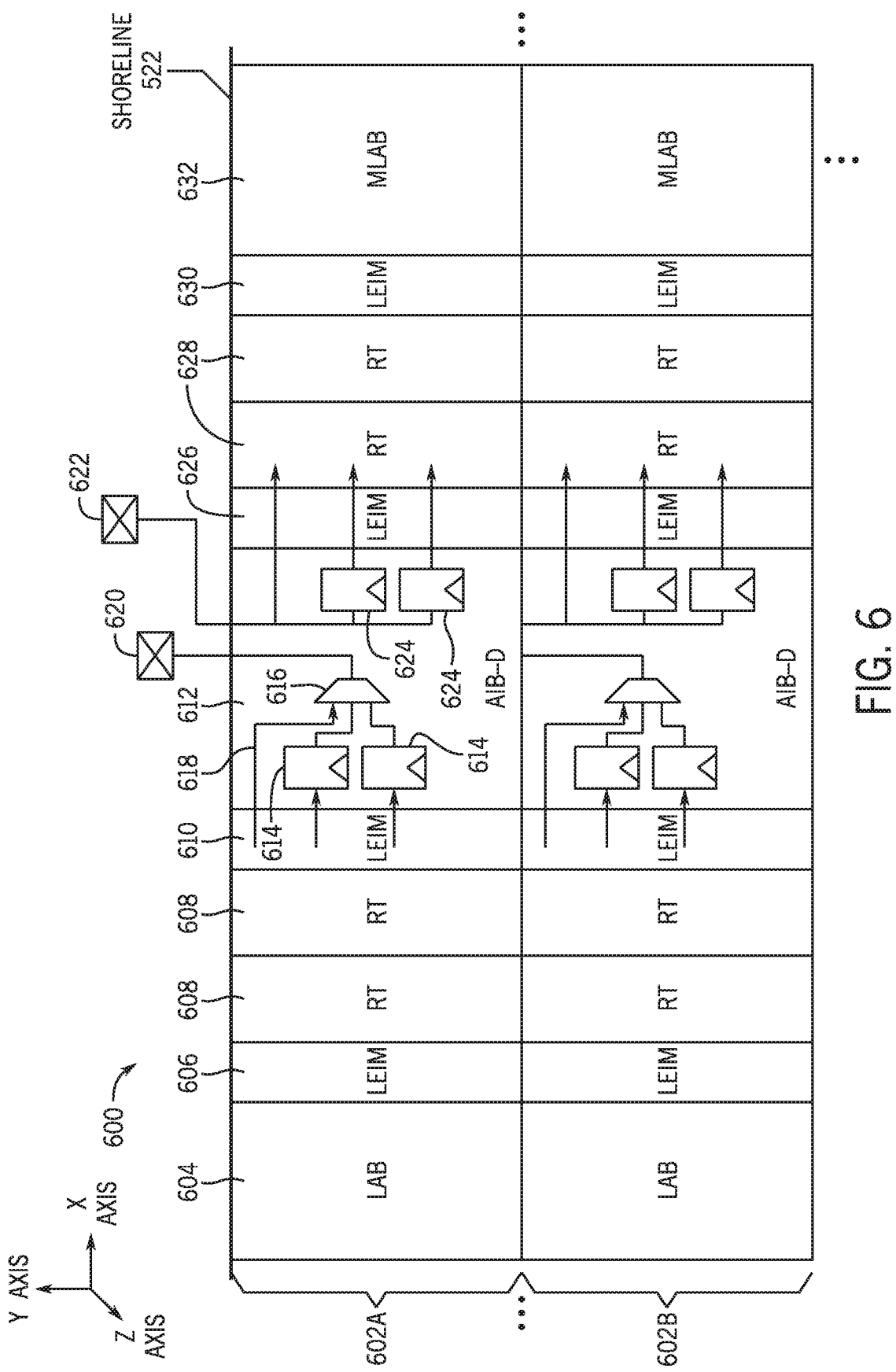
FIG. 6 is a schematic of routing structure in the glue die of FIG. 5 that facilitates connectivity between the periphery IP tiles and the glue dies, in accordance with an embodiment of the present disclosure.

To further illustrate a particular embodiment of the standardized interface of the FPGA device 500 may enable meeting connectivity demands between the periphery IP tiles 304 and the glue dies 504, FIG. 6 illustrates a time-division multiplexing (TDM) routing structure 600 of the AIB-D interface 506 in the glue die 504, in accordance with an embodiment of the present disclosure. Each sector 508 of the glue die 504 may include one or more rows (e.g., 602A, 602B), such as 43 rows, of components that facilitate processing and routing of data. The rows 602A, 602B, as seen in FIG. 5, may be parallel to the shoreline 522, with row 602A being closer to the shoreline and row 602B being adjacent to row 602A, but closer to a centerline 524 of the glue die 504. Additionally, the rows 602A, 602B may include similar TDM routing architecture.

For example, the row (e.g., 602A) may include a portion of a logic array block column (LAB) 604 that may provide programmable functionality to the glue die 504. In particular, the LAB 604 may implement logic functions, arithmetic functions, register functions, and the like based on the circuit design implemented (e.g., in the form of a bitstream programmed in CRAMs of the FPGA device 500 corresponding to the LAB 604). The LAB 604 may be fabricated next to a column of logic element input multiplexers (LEIM) 606. The LEIM 606 may act as a selection circuit that routes signals from various portions of the glue die 504, such as to or from the logic blocks within the LAB 604 based on the circuit design implemented (e.g., in the form of a bitstream programmed in CRAMs of the FPGA device 500 corresponding to the LAB 604). In some embodiments, data processed by the LAB 604 may be transmitted to the LEIM 606 via a fabric horizontal wire.

The LEIM 606 may multiplex the data received from the LAB 604 into the routing fabric (RT) 608, which may include one or more programmable interconnect blocks that connect incoming data channels to outgoing data channels. In some embodiments, the RT 608 may route received data signals from the LEIM 606 to another LEIM column 610, which in turn may further transmit the data to the AIB-D interface 612 (e.g., AIB-D interface 506) that stretches deep into the sector 508.

As previously mentioned, the AIB-D interface 612 may facilitate meeting the connectivity demands between the periphery IP tile 304 and the glue dies 504 with reduced latency and greater reach. In particular, the AIB-D interface 612 may include one or more IP columns that house bidirectional I/O buffers to facilitate wire-to-wire connectivity and/or any suitable form of time-division multiplexing (TDM) support (e.g., 2:1 TDM, 4:1 TDM, 5:1 TDM, 6:1 TDM, 7:1 TDM, 8:1 TDM, 4:3 TDM, 4:2 TDM, or the like) that facilitates conversion of data multiple bits wide to data that is fewer bits wide. In both cases, the AIB-D interface 612 may provide direct die-to-die connectivity without traversing a network-on-chip.

To provide TDM support, the AIB-D interface 612 may include a TDM structure that provides synchronous and accelerated data transfer. For example, to include the TDM structure in the sector 508, a LAB column of the sector 508 may be replaced with the AIB-D interface column 612. To the programmable fabric, the replacement will merely appear as if the LAB column has been replaced by another IP column.

In particular, the TDM structure may include one or more flip flops 614 that receive the data from the LEIM 610. The flip flops 614 may be coupled to a multiplexer (MUX) 616 that may increase the transmission speed of the data. As an example, the MUX 616 may be a 2:1 MUX that operates at a clock speed running twice as fast as a clock of the programmable fabric of the glue die 504. Thus, the multiplexer 616 may increase the transmission of the data from a single data rate (SDR) to a double data rate (DDR).

Because the TDM structure runs at the higher signal bandwidth (e.g., DDR) than the programmable fabric, the AIB-D interface 612 may increase the number of connections (e.g., direct connections without using network-based communication) between the glue die 504 and the periphery IP tile 304 to, for example, two connections per microbump when the TDM structure is implemented as opposed to one connection per microbump when the TDM structure is not implemented. That is, the higher signal bandwidth (e.g., two times wider) may enable faster transmission of data than possible when compared to routing through the programmable fabric itself. For example, the AIB-D interface 612 may operate at a 1.4 GHz rate while the programmable fabric may be capable of running at a 700 MHz clock or slower. Thus, restrictions and latency on the number of connections possible due to the limited microbumps may be overcome by the increased signal density.

Additionally, the AIB-D interface 612 may reduce latency as the AIB-D interface 612 may have further reach (e.g., connection) into the programmable fabric of the glue die 504 than HIOs/VIOs used in monolithic FPGA designs without blocking routing circuitry of the glue die 504. In other words, because the AIB-D interface 612 may be spread throughout the glue die 504 without being pushed deep into the routing fabric of the glue die 504, routing may not be restricted to the edges of the programmable fabric, and traditional routing congestion may be alleviated. For example, the AIB-D interface 612 may replace at least some of the VIOs and may provide ten times more reach for wire connection to the periphery IP tile 304 than the HIO s/VIO s.

Alternatively, in some embodiments, direct communication between the glue die 504 and the periphery IP tiles 304 may occur via wire-to-wire communication (e.g., direct wire mode) that bypasses the TDM functionality. That is, the AIB-D interface 612 may be configured to transfer data in TDM mode or the direct wire mode via the circuit design stored in the CRAM bits or the compressed sparse row (CSR) bits. Further, data may be transferred from the LEIM 610 to the multiplexer 616 to transmit the data downstream at a higher bandwidth speed, but without using a TDM technique on the data.

Figure 7:
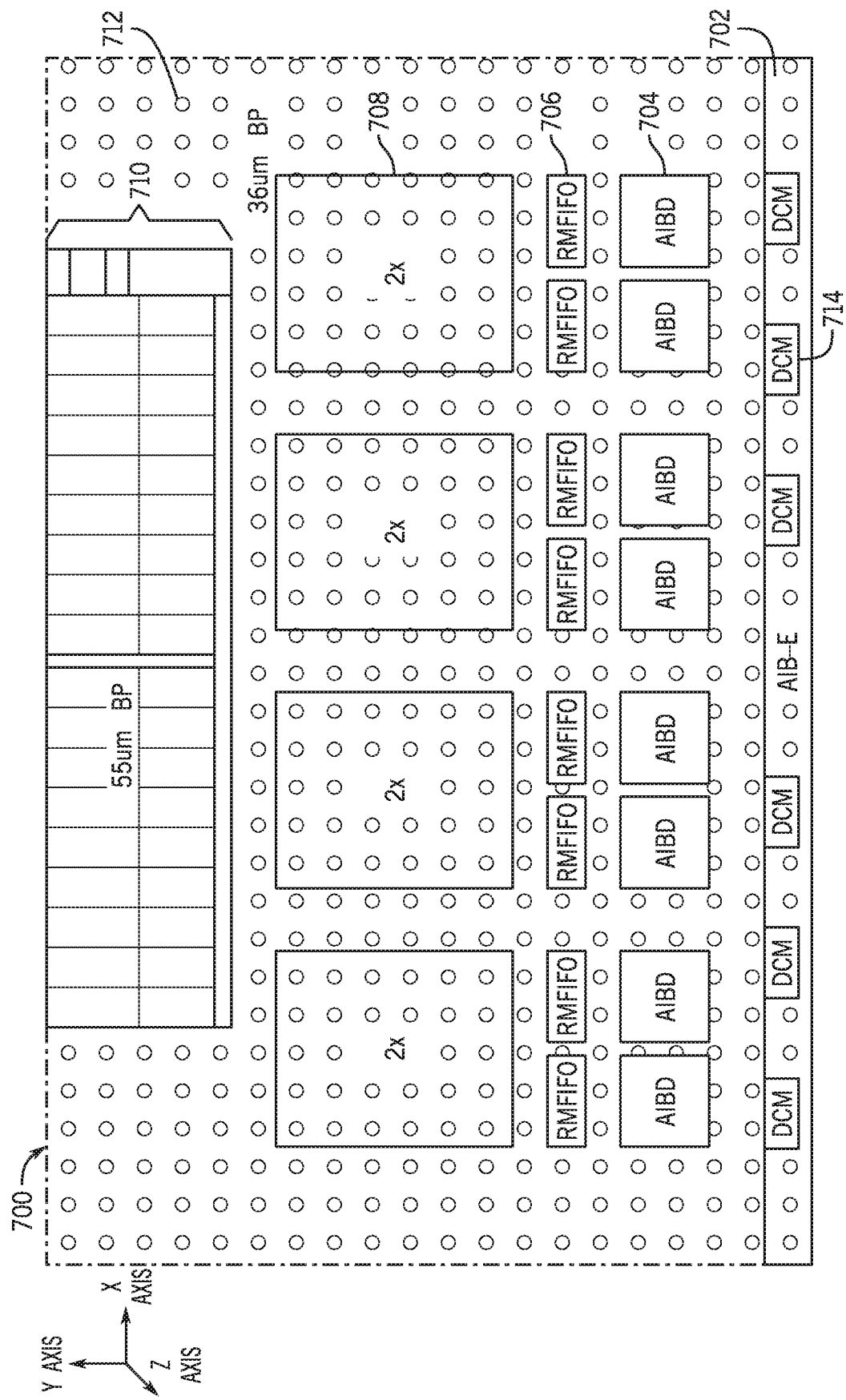
FIG. 7 is a schematic of routing structure of the periphery IP tile of FIG. 5 that facilitates connectivity between the periphery IP tiles and the glue dies, in accordance with an embodiment of the present disclosure.

Once multiplexed, the data may be transmitted to a microbump 620 of the glue die 504, from the microbump 620 to the link (e.g., silicon interposer 306) running at the higher bandwidth speed, such as 1.4 GHz, and from the silicon interposer 306 to a microbump of the periphery IP tile 304. FIG. 7 illustrates a top-down view of routing architecture 700 of the periphery IP tile 304 that includes the periphery IP tile microbump that may receive the data from the silicon interposer 306, in accordance with an embodiment of the present disclosure.

The routing architecture 700 of the periphery IP tile 304 may include an AIB-E interface 702, the AIB-D interface 704 (e.g., AIB-D interface 406), a rate-matching first-in-first-out buffer (RMFIFO) 706, a 2× controller 708, an IO area 710, and microbumps 712. It should be appreciated that the routing architecture may include a greater or fewer number of components and/or types of components. It should also be understood that while the following description of the routing architecture is discussed in light of a UM periphery IP tile 304B, the routing architecture may be applicable to any periphery IP tile 304, such as the I/O tile 304A.

In particular, the microbumps 712 may be spread throughout the periphery IP tile 304 and may facilitate connectivity between the periphery IP tile 304 and the glue die 504 by each connecting to a corresponding microbump of the glue die 504. For example, the microbump 712 may receive the data sent over the silicon interposer 306 from the microbump 620. Buffers of AIB-E interface 702 may be grouped towards an edge of the periphery IP tile 304 and, as discussed above, may bridge the NOC of the glue die 504 to the FNOC interface 408 of the periphery IP tile 304 to provide a high-speed interface connection. The AIB-E interface 702 may include one or more data center managers 714 that enable real-time monitoring and management of data stored in the buffers of the AIB-E interface 702.

The routing architecture 700 may also include the AIB-D interface 704. In some embodiments, the AIB-D interface 704 of the periphery IP tile 304 may be grouped in localized areas of the routing architecture. Further, the AIB-D interface 704 may have similar functionality as the AIB-D interface 612 of the glue dies 504. For example, the AIB-D interface 704 may include a TDM structure to accelerate data from a single data rate to a double data rate. Further, the AIB-D interface 704 may deaccelerate data from a double data rate to a single data rate, such as when the data is received from the microbump 620 of the glue die 504.

In addition, the routing architecture 700 may include the IO area 710. The IO area 710 may include IP architecture to facilitate operations of the periphery IP tile 304. For example, the IO area 710 may include UM buffers, clocks, and controls that enable the IO area 710 to interface with an external memory device, such as high memory bandwidth dynamic random-access memory die (HBM DRAM). The IP architecture however, may be modified such that the microbumps 712 extending into the IO area 710 may be rerouted through the silicon interposer 306 to these external memory devices to enable the interfacing with the external memory devices.

The components may also include a 2× controller 708 that includes two controllers, each of which control an HBM data channel. Since each HBM data channel may include two sub-channels, as shown, the routing architecture 700 may include 8 controllers 708 that control 16 channels for HBM interfacing. Additionally, the components may include one or more RMFIFOs 706 that adapt HBM frequency to the programmable fabric (e.g., advanced interactive eXecutive (AIX)) frequency, and vice versa, to ensure appropriate interfacing between the programmable fabric and the external interface device. The RMFIFOs 706 may communicate with the AIB-D interface 704 as opposed to a block that communicates to the programmable fabric directly via programmable fabric routing (e.g., the HIOs/VIOs).

As an example of how the routing architecture 700 of the periphery IP tile 304 may coordinate with the routing architecture 600 of the glue die 504, the microbump 620 may transmit the data at a double data rate (DDR) via the silicon interposer 306 to the microbump 712. From the microbump 712, the data may be transmitted through a metallization layer stacked on top of the periphery IP tile 304 and to the AIB-D interface 704. The AIB-D interface 704 may facilitate converting the DDR data to single data rate (DSR) to enable matching clock speeds of the glue die 504 and the periphery IP tile 304. Once the data has been converted to SDR, the data may be transmitted to the RMFIFOs 706, which may adapt the data frequency to meet the frequency of the HBM. The data may then be transmitted to the 2× controller 708 and from an HBM channel of the 2× controller 708 to a microbump 712 in the IO area 710. From the microbump 712 in the IO area 710, the data may be transmitted to a microbump of the HBM, and finally, to the HBM DRAM for processing and/or storage.

In addition to the data being transferred from the glue die 504 to the periphery IP tile 304, the data may be transferred from the periphery IP tile 304 to the glue die 504 using the routing architecture 700 of the periphery IP tile 304 and the routing architecture 600 of the glue die 504.

For example, the data processed and/or stored in the HBM DRAM may be transmitted to a microbump of the HBM. The data may then be transferred from the HBM microbump to a microbump 712 in the IO area 710 via the silicon interposer 306. The data may then return to the IO area area 710 and be transmitted through the 2× controller 708, to the RMFIFO 706, to the metallization layer, and subsequently to buffers of the AIB-D interface 704. Once accelerated from SDR to DDR, the data may be transmitted to the microbump 712 of the periphery IP tile 304, to the silicon interposer 306, and subsequently to another microbump 622 of the glue die 504.

Returning to FIG. 6, the microbump 622 of the glue die 504 may be connected to the TDM structure of the AIB-D interface 612. In particular, the data may be transmitted from the microbump 622 to one or more flip flops 624 that may demultiplex the data running at DDR when on the silicon interposer 306 to SDR. By decelerating the data transmission rate, timing issues may be avoided when transmitting the data to the slower running programmable fabric. The TDM structure may then transmit the data directly to an LEIM column 626, which may appropriately multiplex the data into routing fabric 628. The routing fabric 628 may transmit the data to an additional LEIM column 630, and from the additional LEIM column 630 to an additional LAB column, such as a memory logic array block (MLAB) column 630 that may store small amounts (e.g., kilobytes) of data. As such, the TDM structure of the AIB-D interface 612, 704 may facilitate meeting connectivity demands for die-to-die connectivity.

The present systems and techniques relate to embodiments for meeting connectivity demands between the periphery IP tiles 304 and the glue dies 504 of a modularized integrated circuit device, such as the FPGA 300. The present embodiments may enable meeting connectivity demands with a limited number of available microbumps (e.g., 712) and thus, may allow designs with a reduced number of microbumps and reduced die/tile silicon size, for example, by 20-30%. As such, the present embodiments may facilitate increase silicon yield. Moreover, the present embodiments may provide lower latency direct connections between the periphery IP tiles 304 and the glue dies 504. In particular, the routing structure may be spread (e.g., deeper reach) throughout the sectors 508 of the glue dies 504 instead of confined to the edge of the programmable fabric, thereby reducing routing congestion. Additionally, data transmission may incur less propagation delays due to less metal characteristics (e.g., capacitance, resistance) of the silicon interposer 306 slowing down the transmission of the data between the periphery IP tiles 304 and the glue dies 504 as compared to data transmission between the periphery IP and the programmable fabric using the HIOs/VIOs.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit system, comprising:
  a first die comprising:
    a first row of components disposed adjacent to a shoreline of the first die comprising a first portion of a time-division multiplexing (TDM) interface and a first portion of programmable fabric circuitry; and
    a second row of components disposed adjacent to the first row of components and further away from the shoreline of the first die than the first row of components, wherein the second row of components comprises a second portion of the TDM interface and a second portion of the programmable fabric circuitry; and a second die comprising a modular periphery intellectual property (IP) tile, wherein the second die is communicatively coupled to the first die via a modular interface, wherein the modular interface is configurable to
enable communication between a first microbump of the first die and a second microbump of the second die via the TDM interface.

2. The integrated circuit system of claim 1, wherein communication between the first die and the second die occurs without traversing a network-on-chip.

3. The integrated circuit system of claim 1, wherein the modular periphery IP tile is configurable to perform a function associated with the programmable fabric circuitry.

4. The integrated circuit system of claim 1, wherein the modular interface is configurable to enable communication by applying a TDM technique or a wire-to-wire connection based at least in part on a configuration bitstream stored in configuration random access memory bits of the first die.

5. The integrated circuit system of claim 4, wherein the TDM technique comprises a 2:1 TDM between the modular periphery IP tile and the programmable fabric circuitry, and wherein the TDM technique enables synchronous data transfer.

6. The integrated circuit system of claim 4, wherein the communication comprises applying the TDM technique to data transmitted by a first microbump of the first die to a second microbump of the second die via a silicon interposer, wherein applying the TDM technique comprises accelerating the data from a single data rate to a double data rate.

7. The integrated circuit system of claim 4, wherein the communication comprises applying the TDM technique to data transmitted by a first microbump of the second die to a second microbump of the first die via a silicon interposer, wherein applying the TDM technique comprises decelerating the data from a double data rate to a single data rate.

8. The integrated circuit system of claim 1, wherein first die comprises:
data selection circuitry configurable to receive data processed by the programmable fabric circuitry;
a communication IP interface configurable to receive the data from the data selection circuitry, wherein the communication IP interface comprises:
a TDM structure configurable to enable the communication between the first die and the second die; and
a bypass connection configurable to enable a wire-to-wire connection by bypassing the TDM structure.

9. The integrated circuit system of claim 8, wherein the TDM structure comprises:
a first circuit configurable to modify a data run rate from a single data rate to a double data rate in response to the data being communicated from the first die to the second die, wherein the first die operates at a slower clock speed; and
a second circuit configurable to modify the data run rate from the double data rate to the single data rate in response to the data being communicated from the second die to the first die.

10. The integrated circuit system of claim 1, wherein the modular interface is configurable to:
enable communication between the first die and a third die without traversing a network-on-chip, wherein the third die comprises another modular periphery IP tile, wherein the other modular periphery IP tile is configurable to perform another function in association with the programmable fabric circuitry; and
enable communication between the first die and the third die using a wire-to-wire connection.

11. A method for programming a modularized integrated circuit system, comprising:
generating, via a design software, a higher-level circuit design for implementation on the modularized integrated circuit system;
generating, via the design software, a lower-level circuit design configuration based at least on the higher-level circuit design;
loading, via the design software, the lower-level circuit design onto the modularized integrated circuit system; and
configuring, via the design software, a modular interface between dies of the modularized integrated circuit system to have a first number of connections between the dies in response to implementing a time division multiplexing (TDM) interface configurable to facilitate communication between microbumps of the dies using a TDM technique, a second number of connections between the dies in response to not implementing the TDM interface, wherein the first number is greater than the second number.

12. The method of claim 11, wherein configuring the modular interface comprises accelerating data communicated between the dies from a single data rate to a double data rate using the TDM interface, wherein the data is communicated from a first die to a second die comprising a faster clock rate than a clock rate of the first die.

13. The method of claim 11, wherein configuring the modular interface comprises decelerating data communicated between the dies from a double data rate to a single data rate using the TDM interface, wherein the data is communicated from a first die to a second die comprising a slower clock rate than a clock rate of the first die.

* * * * *